United States Patent
Arai et al.

(10) Patent No.: US 8,034,135 B2
(45) Date of Patent: Oct. 11, 2011

(54) FUEL MODIFICATION APPARATUS HAVING AN EVAPORATOR ARRANGED AROUND A SUPERHEATER

(75) Inventors: Takashi Arai, Saitama (JP); Hikaru Okada, Asaka (JP); Mitsuru Ikeo, Utsunomiya (JP); Takeshi Yamagami, Saitama (JP); Nobuyoshi Yoshida, Utsunomiya (JP); Noriyuki Mizojiri, Utsunomiya (JP); Satoshi Hanai, Suzaka (JP)

(73) Assignee: Honda Motor Co., Ltd., Tokyo (JP)

( * ) Notice: Subject to any disclaimer, the term of this patent is extended or adjusted under 35 U.S.C. 154(b) by 751 days.

(21) Appl. No.: 11/886,599

(22) PCT Filed: Mar. 7, 2006

(86) PCT No.: PCT/JP2006/304408
§ 371 (c)(1),
(2), (4) Date: Sep. 18, 2007

(87) PCT Pub. No.: WO2006/100908
PCT Pub. Date: Sep. 28, 2006

(65) Prior Publication Data
US 2009/0155141 A1    Jun. 18, 2009

(30) Foreign Application Priority Data

Mar. 18, 2005 (JP) ................. 2005-079186
Mar. 18, 2005 (JP) ................. 2005-079372
Mar. 18, 2005 (JP) ................. 2005-080544

(51) Int. Cl.
*C01B 3/38* (2006.01)

(52) U.S. Cl. .......................... 48/127.9; 48/61
(58) Field of Classification Search .......... 48/61–118.5, 48/127.9; 422/129–242; 429/12–46
See application file for complete search history.

(56) References Cited

U.S. PATENT DOCUMENTS

| 4,849,187 A | 7/1989 | Uozu et al. |
| 2002/0007595 A1* | 1/2002 | Maier-Roeltgen et al. ..... 48/116 |
| 2002/0042035 A1* | 4/2002 | Komiya et al. ............... 431/268 |

(Continued)

FOREIGN PATENT DOCUMENTS

EP    0600621 A1    6/1994

(Continued)

OTHER PUBLICATIONS

European Office Action for Application No. 06728727.6, dated May 21, 2008.

*Primary Examiner* — Alexa Neckel
*Assistant Examiner* — Imran Akram
(74) *Attorney, Agent, or Firm* — Nelson Mullins Riley & Scarborough LLP; Anthony A. Laurentano

(57) ABSTRACT

A fuel modification apparatus is equipped with evaporators for evaporating a raw fuel as a fuel to be modified, a super heater for elevating the temperature of the above evaporated raw fuel to a temperature required for the modification, a modification vessel for modifying the above raw fuel having an elevated temperature to form a modified gas, and a preheater for preheating a heating fluid for evaporating the above raw fuel in the evaporator. The evaporators are arranged on a concentric circle, surrounding the superheater.

17 Claims, 14 Drawing Sheets

U.S. PATENT DOCUMENTS

| | | |
|---|---|---|
| 2004/0047799 A1 | 3/2004 | Randhava et al. |
| 2004/0123523 A1* | 7/2004 | Rong et al. ............... 48/200 |
| 2007/0151152 A1* | 7/2007 | Mukai et al. ............ 48/127.9 |

FOREIGN PATENT DOCUMENTS

| | | | |
|---|---|---|---|
| EP | 1197261 A2 | | 4/2002 |
| EP | 1408004 A2 | | 4/2004 |
| EP | 1505036 A2 | | 2/2005 |
| JP | 2003-192304 | | 7/2003 |
| JP | 2003-410014 | * | 1/2005 |

* cited by examiner

FUEL MODIFICATION APPARATUS HAVING AN EVAPORATOR ARRANGED AROUND A SUPERHEATER

RELATED APPLICATIONS

This application is a 35 U.S.C. 371 national stage filing of International Application No. PCT/JP2006/304408, filed 7 Mar. 2006, which claims priority to Japanese Patent Application No. 2005-079372 filed on 18 Mar. 2005, Japanese Patent Application No. 2005-080544 filed on 18 Mar. 2005, and Japanese Patent Application 2005-079186 filed on 18 Mar. 2005 in Japan. The contents of the aforementioned applications are hereby incorporated by reference.

TECHNICAL FIELD

The present invention relates to a fuel reforming (modification) apparatus for reforming a reforming fuel in order to produce a hydrogen rich fuel gas.

BACKGROUND ART

For example, as a fuel gas, a gas chiefly containing hydrogen (hereinafter also referred to as a hydrogen-containing gas) is supplied to a fuel cell. For use as the hydrogen-containing gas, in general, a reformed gas produced by obtaining a reformed raw fuel from a hydrocarbon fuel, such as methanol or a fossil fuel, e.g., LNG, and processing the reformed raw material gas by steam reforming, partial oxidation reforming, or autothermal reforming, or the like, is used.

For example, in the reforming apparatus disclosed in Japanese Laid-Open Patent Publication No. 2003-192304, as shown in FIG. 14, pure water supplied to an evaporator 1 is evaporated inside the evaporator 1 by a combustion exhaust gas. Then, the resulting water vapor is supplied to a reformer 3 through a heat exchanger 2. The evaporator 1 includes an evaporation heat exchanger 4 having a heat exchange unit for evaporating water to produce water vapor, as a result of the combustion exhaust gas, which acts as a heat exchange gas. The evaporation heat exchanger 4 includes a plurality of pipes 5 disposed in parallel, together with an inlet manifold 6 and an outlet manifold 7 serving as openings at an upstream end and a downstream end of the pipes 5. Further, a fabric material 8, for preventing protrusion of the pipes 5, is disposed inside the inlet manifold 6.

In the reforming apparatus, the evaporator 1, the heat exchanger 2, and the reformer 3 are arranged in a flow direction of the water vapor, in the direction indicated by the arrow X. In practice, although not shown, the evaporator 1, the heat exchanger 2 and the reformer 3 are connected by pipes. Since plural pipes are used, the overall size of the reforming apparatus tends to be large. Further, heat tends to radiate easily from the pipes, and as a result of the heat energy loss due to heat radiation, heat efficiency is lowered.

Further, in the evaporator 1, water flows along the pipes 5 in the direction indicated by the arrow X, whereas the combustion exhaust gas is supplied in the direction indicated by the arrow Y, perpendicular to the direction of the arrow X. At this time, in order to reliably produce water vapor by evaporating pure water passing through the pipes 5, it is necessary to supply a predetermined amount of heat energy from the combustion exhaust gas to the pure water. Therefore, in order to ensure that heat exchange is performed between the pure water and the combustion exhaust gas for a sufficient period of time, the pipes 5 are required to be considerably long in the direction of the arrow X. Thus, the size of the evaporator 1 tends to be significantly large in the direction indicated by the arrow X, such that a reduction in the overall size of the reforming apparatus cannot be achieved.

DISCLOSURE OF THE INVENTION

The present invention solves the aforementioned problems, wherein an object of the present invention is to provide a fuel reforming apparatus, having a simple and compact structure, in which pipes are eliminated as much as possible, and an improvement in heat efficiency can be achieved.

A further object of the present invention is to provide a fuel reforming apparatus, having a simple and compact structure, in which heat exchange is performed efficiently between a reforming fuel and a heating fluid.

The present invention relates to a fuel reforming apparatus for reforming a reforming fuel in order to produce a hydrogen rich fuel gas. The fuel reforming apparatus comprises an evaporator for evaporating the reforming fuel by heat exchange with a heating fluid, a superheater for raising the temperature of the evaporated reforming fuel to a temperature required for a reforming reaction, and a reformer for reforming the reforming fuel, after the temperature of the reforming fuel has been raised, in order to produce a reformed gas. The evaporator is disposed around the superheater, and the superheater and the reformer are connected together in series.

According to the present invention, connection of the superheater, the evaporator, and the reformer using pipes is unnecessary, and hence, the pipes can desirably be eliminated (or shortened). Accordingly, heat radiation from the pipes is reduced, and a fuel reforming apparatus having a simple and compact structure as a whole can be provided.

BEST MODE FOR CARRYING OUT THE INVENTION

Figure 1:
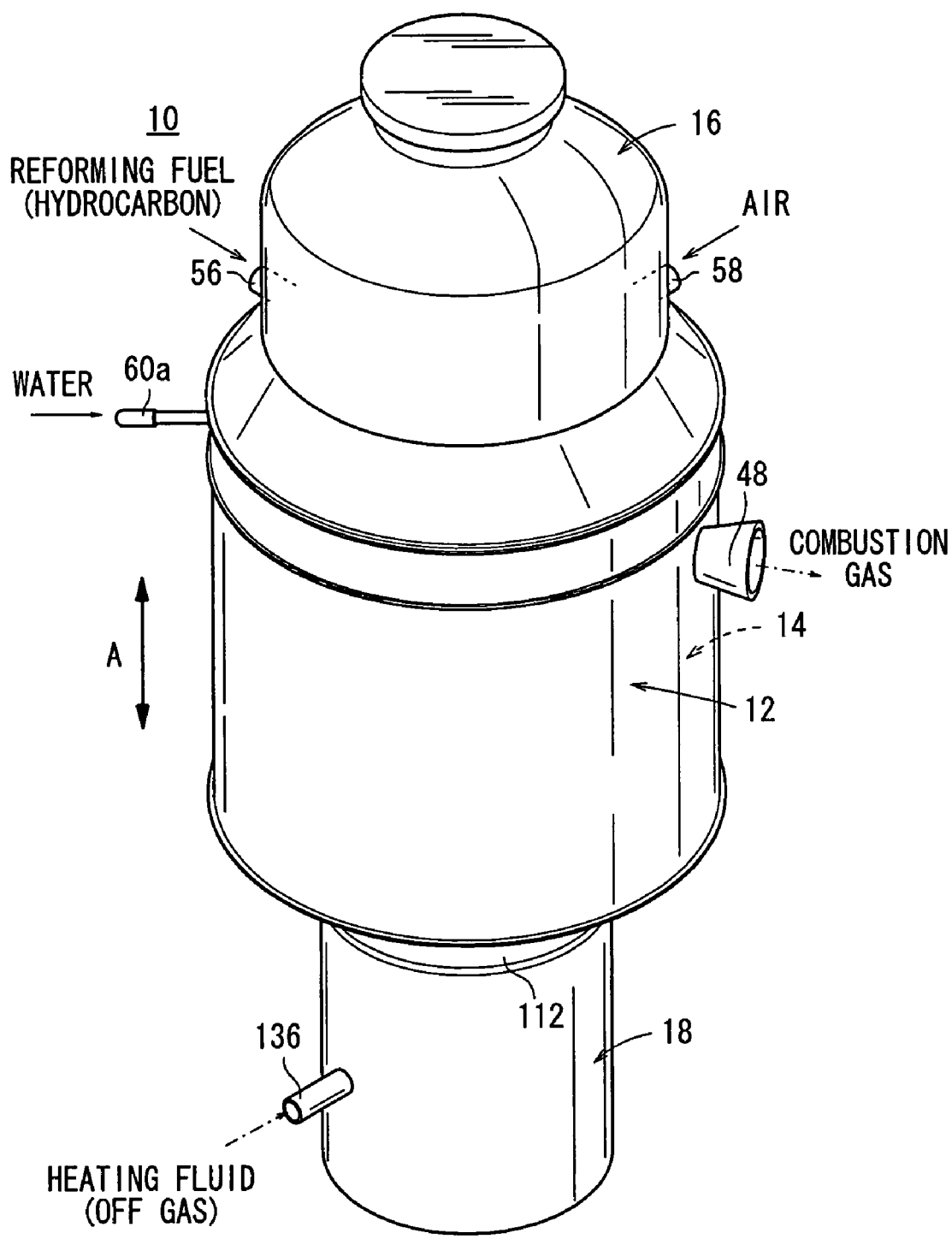
FIG. 1 is a perspective schematic view showing a fuel reforming apparatus according to a first embodiment of the present invention.
Figure 2:
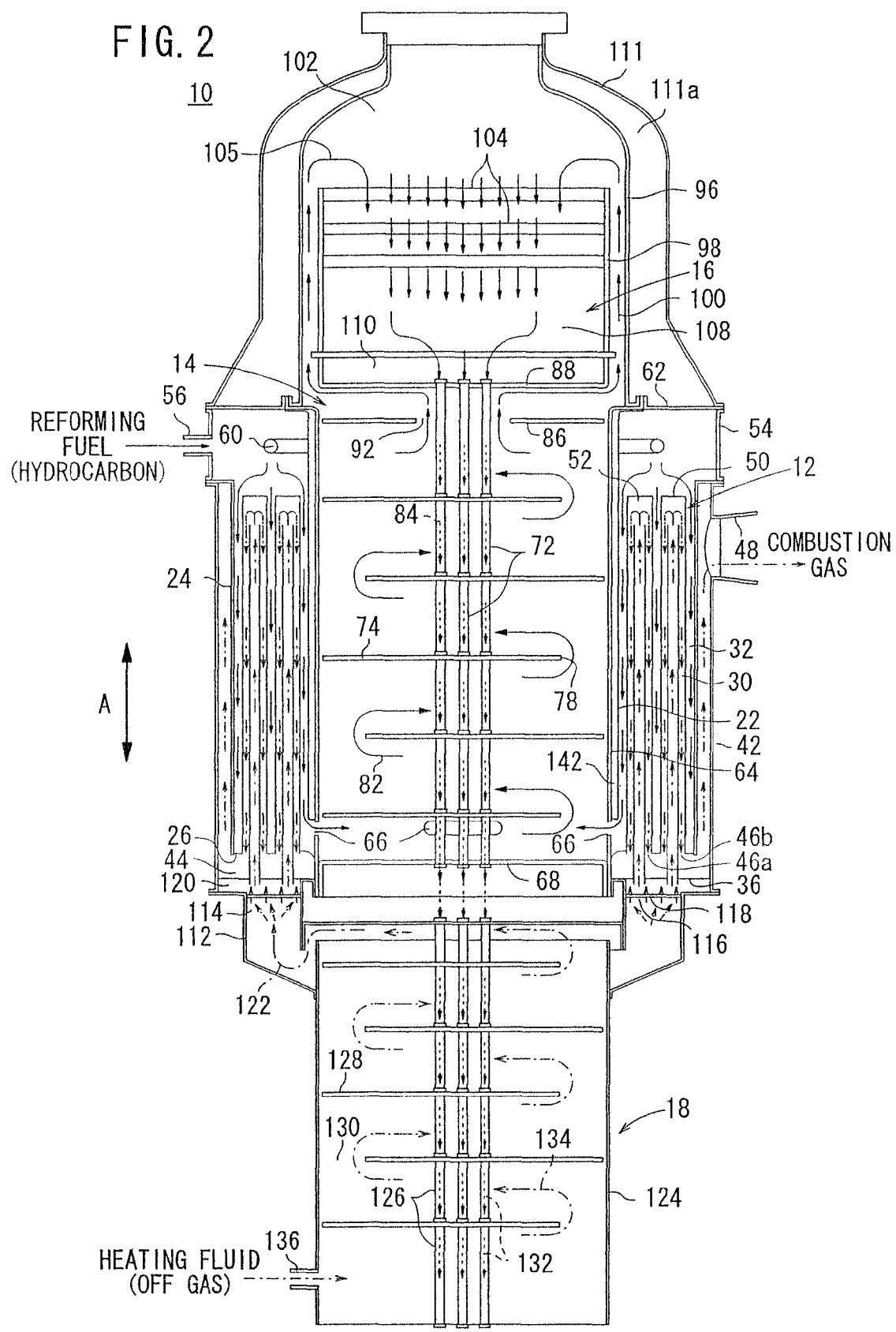
FIG. 2 is a cross sectional view showing gas flows within the fuel reforming apparatus.

FIG. 1 is a perspective schematic view showing a fuel reforming apparatus 10 according to a first embodiment of the present invention. FIG. 2 is a cross sectional view showing gas flows within the fuel reforming apparatus 10.

The fuel reforming apparatus 10 reforms a reforming fuel, containing a hydrocarbon such as methane and alcohol or the like, in order to produce a hydrogen rich fuel gas. The fuel gas is supplied to a fuel cell (not shown).

The fuel reforming apparatus 10 includes an evaporator 12, a superheater 14, a reformer 16, and a preheater 18. The evaporator 12 evaporates the reforming fuel. The superheater 14 raises the temperature of the evaporated reforming fuel, up to a temperature required for the reforming reaction. After the temperature of the reforming fuel has been raised, the reformer 16 reforms the reforming fuel in order to produce a reformed gas. The preheater 18 preheats the heating fluid, which is used for evaporating the reforming fuel at the evaporator 12. The evaporator 12 is disposed concentrically around the superheater 14. The superheater 14 and the reformer 16 are disposed coaxially and connected in series with each other. The preheater 18 and the superheater 14 are also disposed coaxially and connected in series with each other, on a side opposite to the reformer 16.

Figure 3:
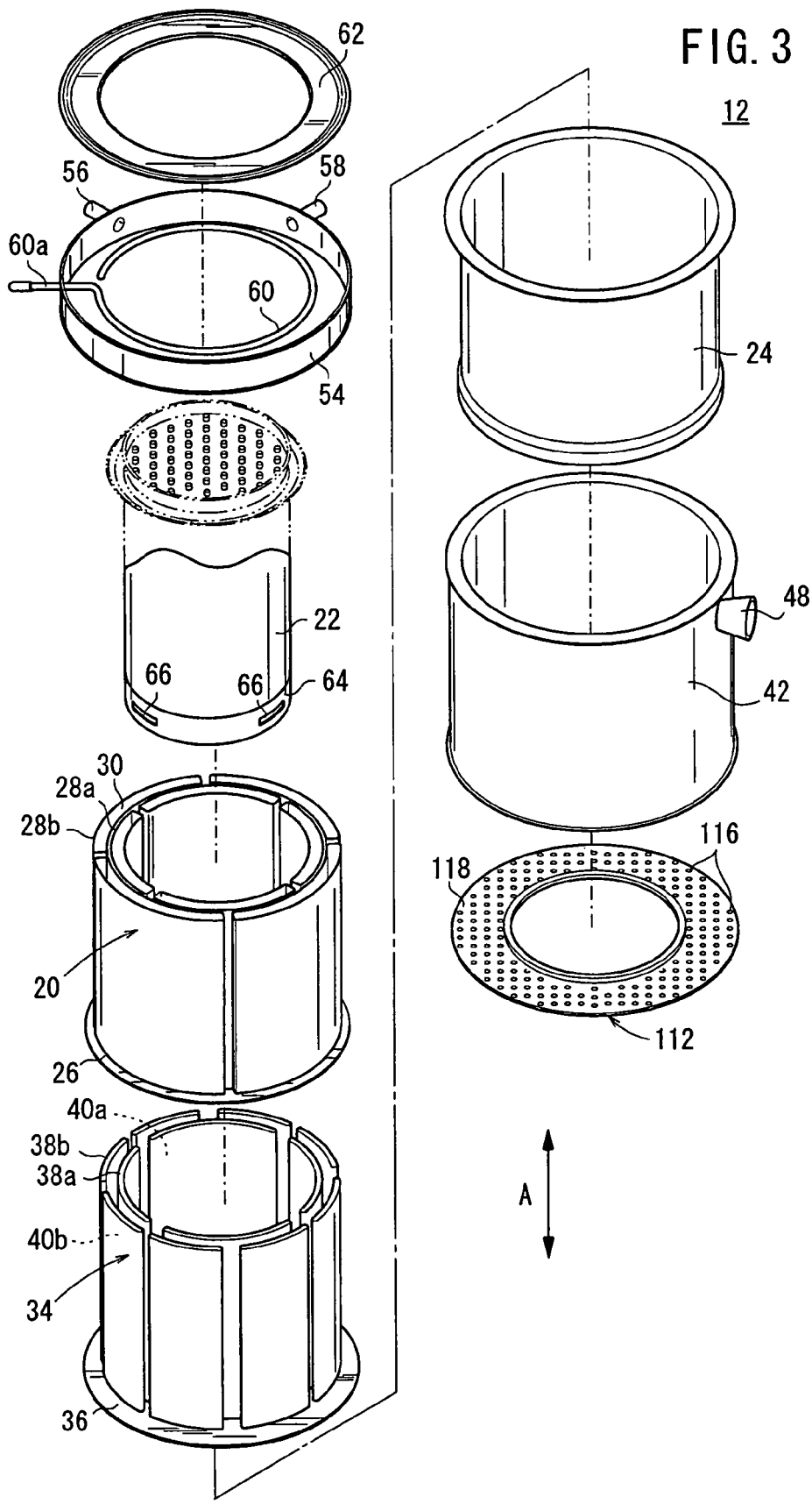
FIG. 3 is an exploded perspective view showing an evaporator of the fuel reforming apparatus.
Figure 4:
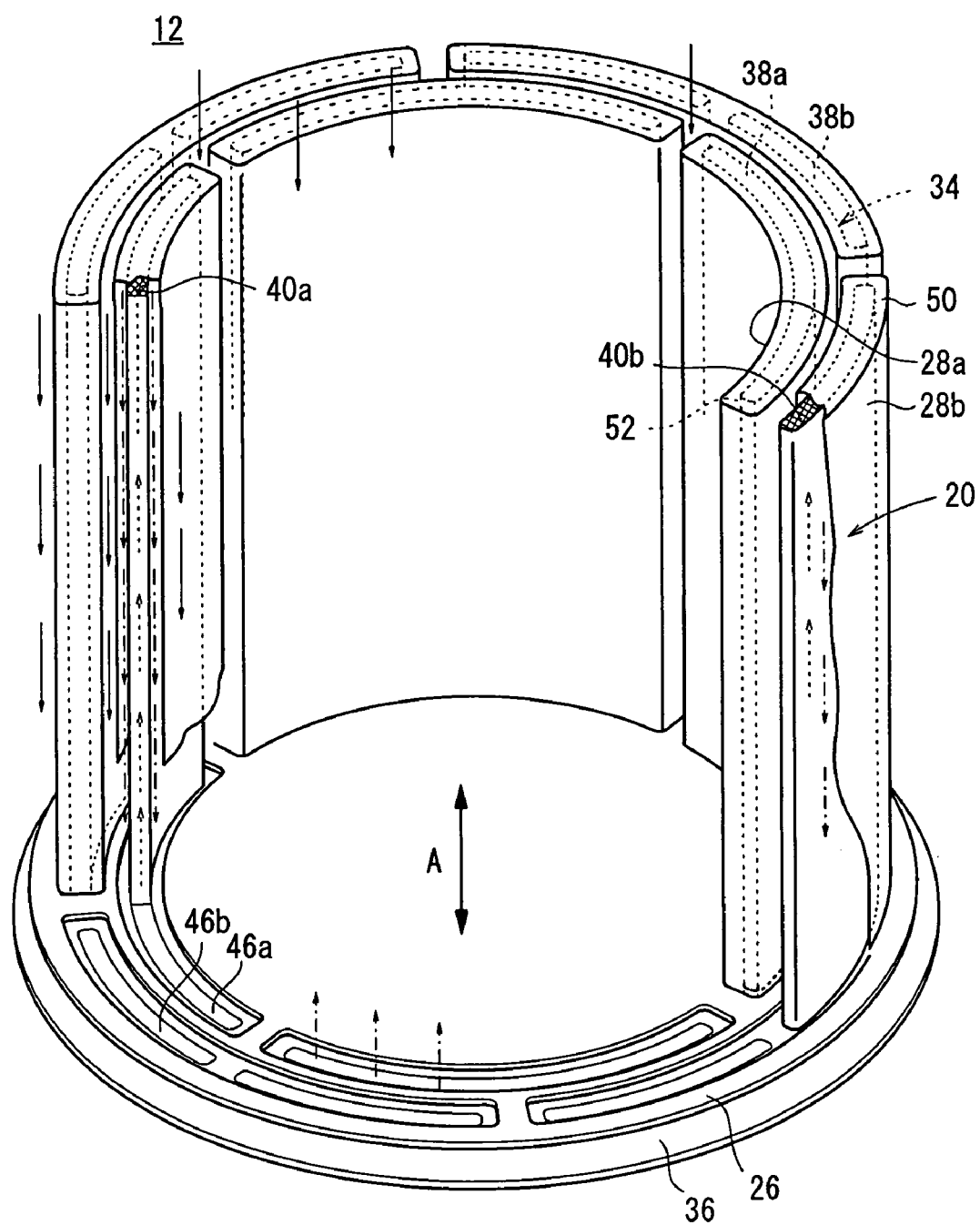
FIG. 4 is a perspective view, with partial omission, showing the evaporator.
Figure 5:
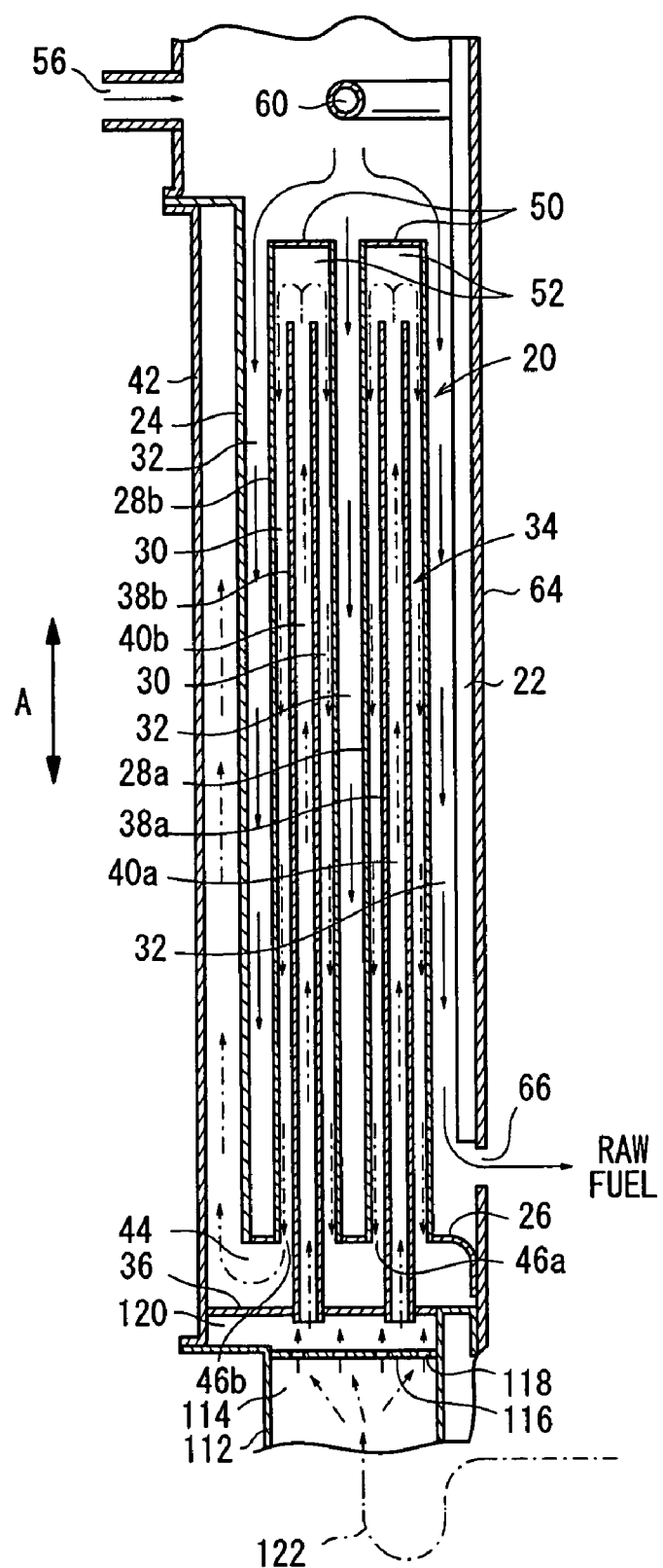
FIG. 5 is a partial cross sectional view showing the evaporator.

As shown in FIGS. 3 to 5, the evaporator 12 includes a curved pipe member 20, an inner cylindrical member (evaporator inner cylinder) 22 and an outer cylindrical member 24. The inner cylindrical member 22 and the outer cylindrical member 24 are disposed concentrically with the curved pipe member 20, on respective sides of the curved pipe member 20. The curved pipe member 20 includes a plurality of circular arc pipes 28a, 28b, each having a circular arc shaped opening in cross section. Ends (lower ends) of the circular arc pipes 28a, 28b, in an axial direction indicated by the arrow A, are defined as fixed ends, which are fixed to a first separator 26. The other ends (upper ends) of the circular arc pipes 28a, 28b are defined as free ends thereof.

Figure 6:
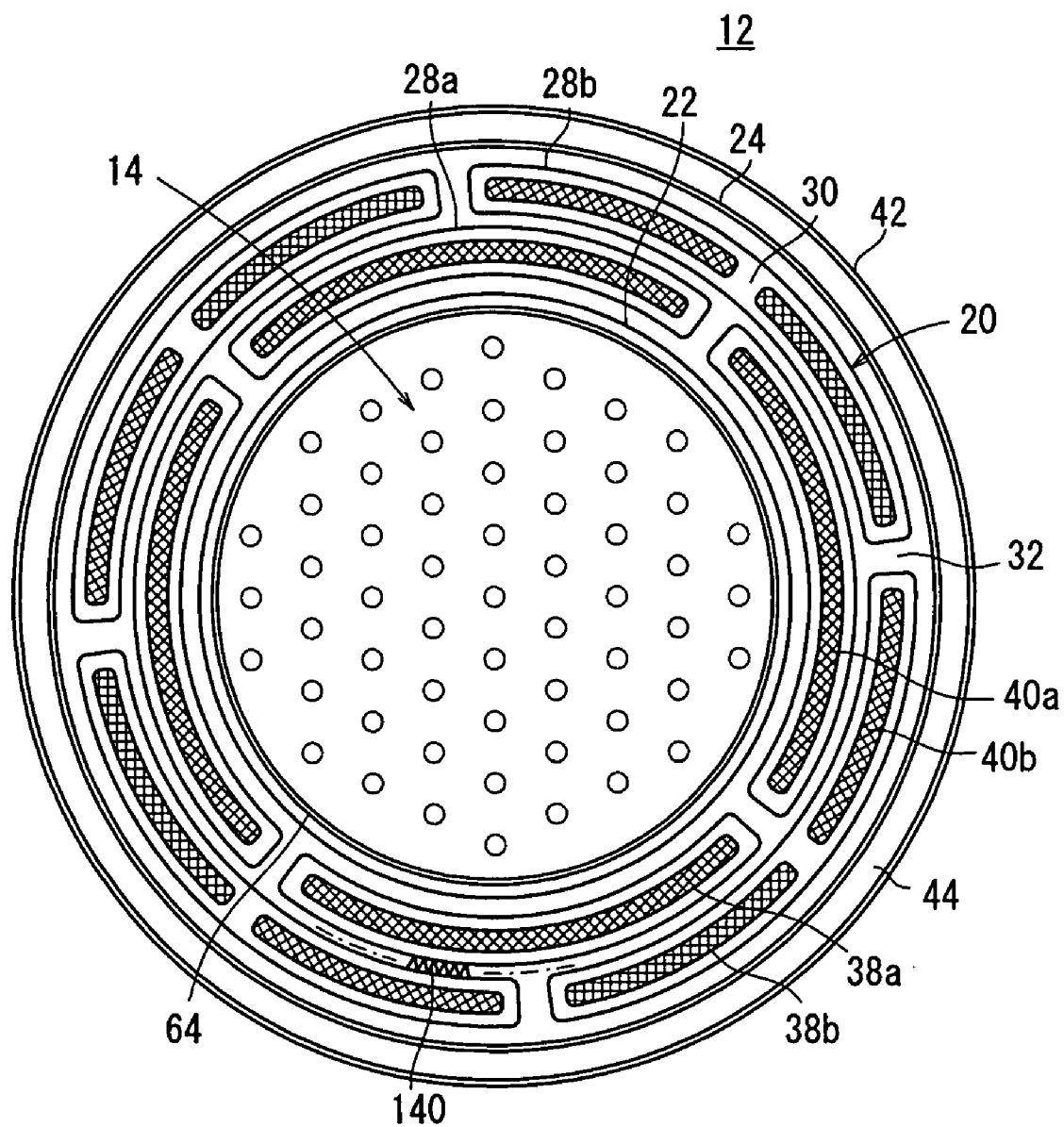
FIG. 6 is a cross sectional view showing the evaporator.

As shown in FIGS. 3 and 6, a plurality of, e.g., four circular arc pipes 28a are disposed along the same circle at equal angular intervals. Further, a plurality of, e.g., four circular arc pipes 28b are disposed along the same circle concentrically around the four circular arc pipes 28a in the first row. The circular arc pipes 28a of the first row are arranged out of phase with the circular arc pipes 28b of the second row. Each of the circular arc pipes 28a, 28b has a first channel 30 formed therein, defining a passage for a combustion gas serving as the heating fluid. A second channel 32 acts as a passage for a raw fuel, serving as the reforming fuel, and is surrounded by the inner cylindrical member 22, the outer cylindrical member 24, and the circular arc pipes 28a, 28b.

A curved combustion catalyst 34 is disposed inside the curved pipe member 20. The curved combustion catalyst 34 is circularly arc shaped in cross section, and includes a plurality of catalyst outer cylinders 38a, 38b arranged in two rows. Ends of the catalyst outer cylinders 38a, 38b, on one side in the axial direction, make up fixed ends, which are fixed to the second separator 36. The other ends of the catalyst outer cylinders 38a, 38b are free ends. One catalyst outer cylinder 38a from the first row is disposed inside each of the circular arc pipes 28a in the first row, whereas two catalyst outer cylinders 38b from the second row are disposed inside each of the circular arc pipes 28b in the second row.

The catalyst outer cylinders 38a are disposed at equal angular intervals. Likewise, the catalyst outer cylinders 38b are disposed at predetermined equal angular intervals. Flat metal honeycombs 40a, 40b supporting a combustion catalyst therein are provided inside the catalyst outer cylinders 38a, 38b.

As shown in FIGS. 2 and 5, the first separator 26 is fixed to a lower end of the outer cylindrical member 24, and the second separator 36 is fixed to a lower end of a substantially cylindrical casing 42 disposed around the outer cylindrical member 24. The first and second separators 26, 36 are spaced from each other by a predetermined distance, thereby forming an off gas fluid path 44. The off gas fluid path 44 is connected to channels 46a, 46b formed between the first separator 26 and the catalyst outer cylinders 38a, 38b. In addition, the off gas fluid path 44 extends between the casing 42 and the outer cylindrical member 24, and opens to the outside through an exhaust port 48 formed at an upper end of the casing 42.

As shown in FIG. 5, an upper end of the outer cylindrical member 24 is fixed to an upper end of the casing 42. Lid members 50 are attached to upper ends of the circular arc pipes 28a, 28b. Chambers 52 are formed between the upper ends of the circular arc pipes 28a, 28b and the upper ends of the catalyst outer cylinders 38a, 38b. As described later, the heating fluid flows upwardly through the metal honeycombs 40a, 40b, turns back at the chambers 52, and flows toward the first channels 30.

As shown in FIGS. 2 and 3, a ring member 54 is attached to an upper end of the casing 42. The ring member 54 is attached to an air supply pipe 58 and to a reforming fuel supply pipe 56 for supplying a reforming fuel such as methane. A water supply pipe 60 is provided in the ring member 54. An end 60a of the water supply pipe 60 passes through the ring member 54 and is exposed to the outside. The water supply pipe 60 is formed in an annular shape, having a plurality of holes (not shown) disposed at a lower position thereof. In this structure, water is supplied like a shower. An annular lid member 62 is attached to an upper portion of the ring member 54. In the event that methane and air are mixed beforehand and supplied from the fuel supply pipe 56, a separate air supply pipe 58 is not required.

Figure 7:
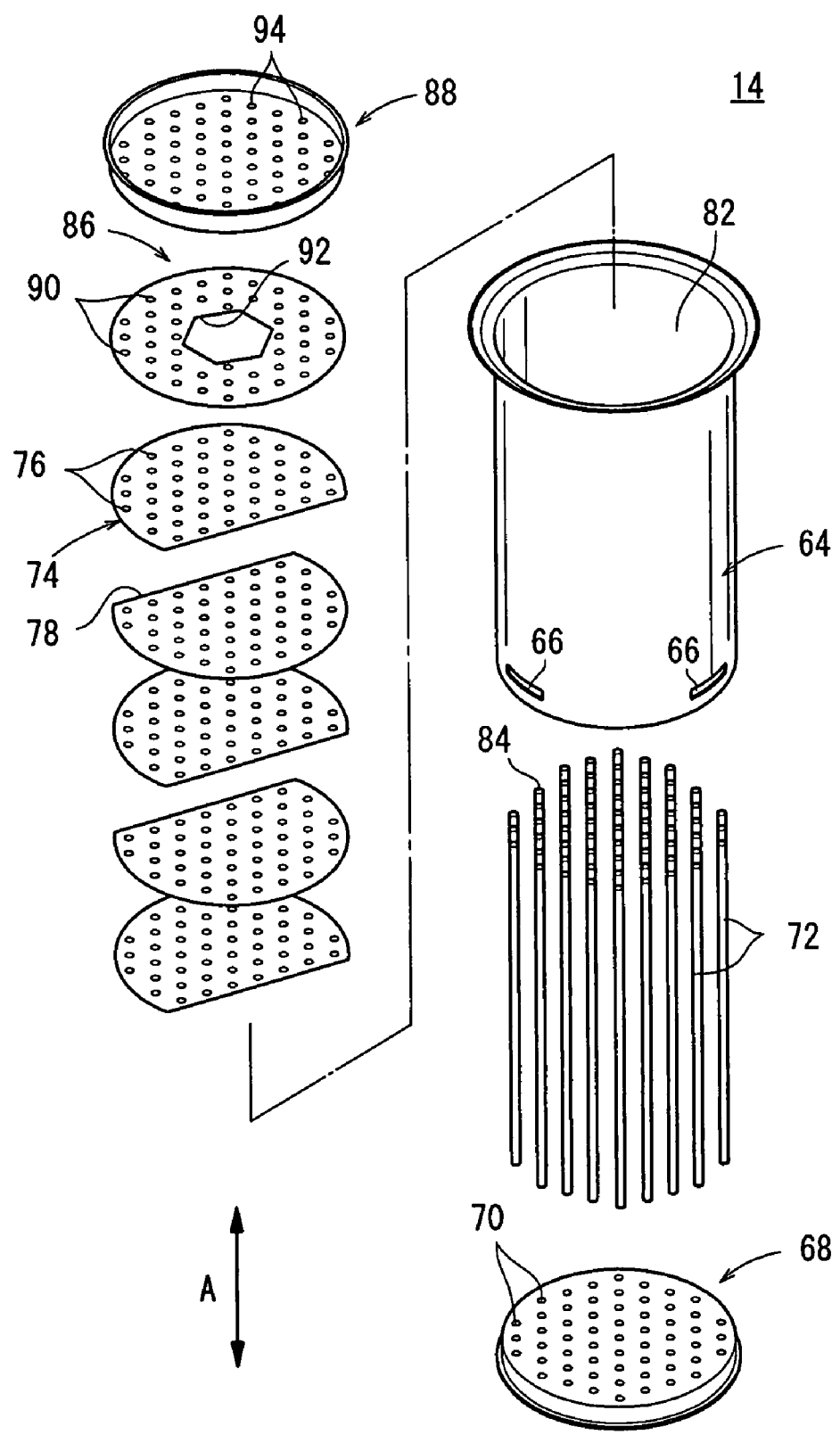
FIG. 7 is an exploded perspective view showing a superheater of the fuel reforming apparatus.

As shown in FIGS. 2 and 7, the superheater 14 includes an outer cylinder (superheater outer cylinder) 64. The outer cylinder 64 is fixed to the inner cylindrical member 22 of the evaporator 12. The outer cylinder 64 is longer than the inner cylindrical member 22, and is elongated in the direction indicated by the arrow A. A plurality of raw fuel inlets 66, which are connected to the second channel 32, are provided in the lower end of the outer cylinder 64, below the bottom of the inner cylindrical member 22, e.g., at four positions. Each of the raw fuel inlets 66 has a circumferential slit or a porous structure. A third separator 68 is fixed to the lower end of the outer cylinder 64.

As shown in FIG. 7, the third separator 68 has a substantially circular disk shape, with a plurality of holes 70 therein. Ends of pipes 72 are fixed to the holes 70 by welding or brazing. A plurality of partition plates 74 are fixed to the pipes 72 by means of insertion under pressure, brazing, or the like, and at disposed predetermined height positions. The partition plates 74 have a plurality of holes 76 therein for insertion of the pipes 72, and cutouts 78 disposed alternately at different positions.

A superheating channel 82 is formed in a serpentine pattern in the outer cylinder 64 by outer portions of the pipes 72 and the cutouts 78 of the partition plates 74 (see FIG. 2). A channel 84 is formed in each pipe 72 for allowing a reformed gas (hydrogen rich gas), heated after reforming, to flow downwardly therethrough. A fourth separator 88 is fixed to upper portions of the pipes 72 through a distribution plate 86. The distribution plate 86 has holes 90 therein for insertion of the pipes 72. Further, a distribution opening (an outlet for the reforming fuel) 92 is provided at the center of the distribution plate 86. The fourth separator 88 has holes 94 therein for insertion of the pipes 72.

Figure 8:
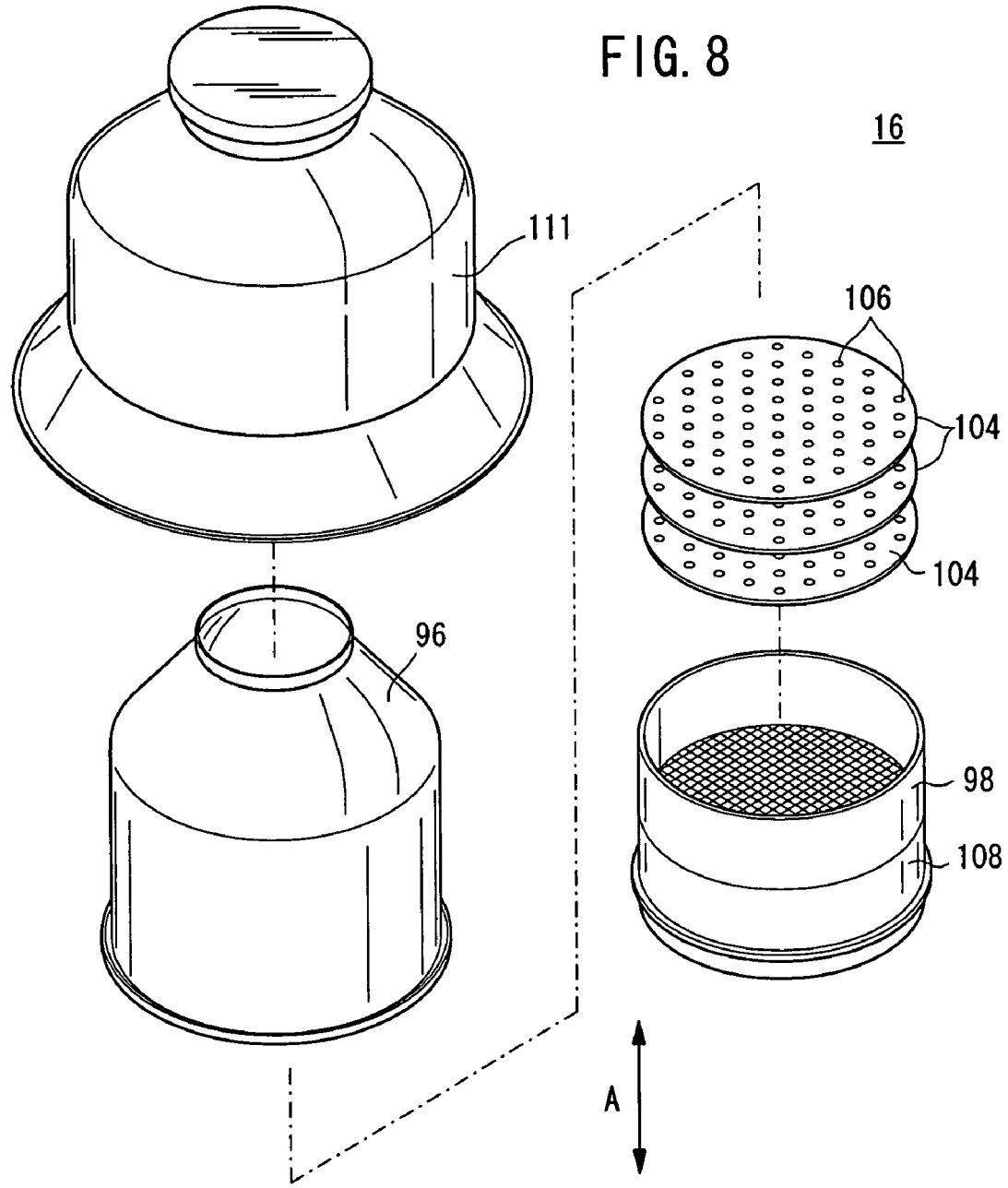
FIG. 8 is an exploded perspective view showing a reformer of the fuel reforming apparatus.

As shown in FIGS. 2 and 8, the reformer 16 includes an outer cylinder 96 and an inner cylinder 98. A raw fuel channel 100, connected to the opening 92, is formed between the outer cylinder 96 and the inner cylinder 98. A closed chamber 102 is formed at an upper position of the outer cylinder 96. After the raw fuel has been supplied from the raw fuel channel 100 to the chamber 102, the raw fuel is supplied from a reforming fuel inlet 105 to a plurality of rectifier plates 104 provided within the inner cylinder 98. A cover member 111 is disposed around the outer cylinder 96, wherein a heat insulating layer (space) 111a is formed inside the cover member 111.

Each of the rectifier plates 104 includes a plurality of holes 106, which function to rectify the flow of the raw fuel. A honeycomb catalyst section 108, supporting a reforming catalyst such as Pd, Pt, or Rh, is provided beneath the rectifier plates 104. The fourth separator 88 is fixed to the catalyst section 108, and a chamber 110, which is connected to the channel 84 of each pipe 72, is formed inside the fourth separator 88.

As shown in FIGS. 2 and 5, the preheater 18 is connected through a connection member 112 to the lower end of the evaporator 12. The connection member 112 forms a ring shaped chamber 114, with a ring shaped plate member 116 provided in an upper position of the chamber 114. The plate member 116 has a plurality of holes 118 therein. The plate member 116 faces the second separator 36 of the evaporator 12, forming a chamber 120 between the plate member 116 and the second separator 36. The chamber 114 is connected, via the holes 118 and the chamber 120, to the catalyst outer cylinders 38a, 38b.

As shown in FIG. 2, the connection member 112 has a channel 122, which is connected to the chamber 114. The channel 122 is connected to the outer cylindrical member 124 of the preheater 18. Similar to the case of the superheater 14, a plurality of pipes 126 and a plurality of partition plates 128 are provided in the outer cylindrical member 124. The pipes extend in the direction indicated by the arrow A. The partition plates 128 have cutouts 130 therein and are disposed alternately at predetermined height positions along the pipes 126.

A channel 132 is provided in each of the pipes 126. The reformed gas, which has passed through the superheater 14, flows downwardly through the channel 132. A preheating channel 134 is formed in a serpentine pattern around the outer surfaces of the pipes 126 and the partition plates 128. The heating fluid flows upwardly through the preheating channel 134. A supply port 136 for supplying the heating fluid is provided at a lower end of the outer portion of the outer cylindrical member 124.

As shown in FIG. 2, for example, as a heat transmission suppression medium (heat transmission suppression structure), a fin member 142 is inserted into a space between the inner cylindrical member 22 of the evaporator 12 and the outer cylinder 64 of the superheater 14, for suppressing heat transmission to the evaporator 12. Instead of the fin member 142, for example, a heat insulating layer may also be formed.

In the fuel reforming apparatus 10, for example, as shown in FIG. 6, a fin member 140 for facilitating heat transmission is inserted between the circular arc pipes 28a, 28b of the evaporator 12. The fin member 140 has a corrugated shape. Alternatively, the fin member 140 may have a planar shape. Preferably, the fin member 140 is shorter, in the direction indicated by the arrow A, than the circular arc pipes 28a, 28b.

The superheater 14 and the preheater 18 are directly connected. Alternatively, a CO shift reactor (not shown), for shift conversion of carbon dioxide in the hydrogen rich gas into hydrogen, may be interposed between the superheater 14 and the preheater 18. Further, a preferential oxidation removal apparatus (PROX), for removing carbon monoxide remaining within the hydrogen rich gas, may be provided on the downstream side of the preheater 18.

Operation of the fuel reforming apparatus 10 having the aforementioned structure shall now be described.

Off gas discharged from a fuel cell (not shown) is supplied as a heating fluid from the supply port 136 of the preheater 18. As shown in FIG. 2, the heating fluid moves upwardly in a serpentine pattern along the preheating channel 134 formed between the cutouts 130 of each of the partition plates 128 and outer portions of the pipes 126. In the channels 132 of the pipes 126, as described later, a hydrogen rich reformed gas, produced by reforming, passes through the superheater 14, and is supplied after being cooled to a temperature of around 300° C.

Thus, after the temperature of the heating fluid has been raised by heat exchange with the reformed gas, the heating fluid flows from the channel 122 of the connection member 112 into the chamber 114. The plate member 116 is provided at the top of the chamber 114. The preheated heating fluid is temporarily supplied into the chamber 120 through the holes 118 of the plate member 116, whereupon the heating fluid moves upwardly along the metal honeycombs 40a, 40b in the catalyst outer cylinders 38a, 38b connected to the chamber 120. Thus, the heating fluid is burned by means of the combustion catalyst supported by the metal honeycombs 40a, 40b, and a combustion gas is obtained.

As shown in FIG. 5, the combustion gas flows into the chambers 52 formed between the upper ends of the catalyst outer cylinders 38a, 38b and the closed upper ends of the circular arc pipes 28a, 28b. The combustion gas turns back downwardly, and then moves downwardly through the first channel 30. For example, a reforming fuel containing, e.g., methane is supplied to the fuel supply pipe 56, air is supplied to the air supply pipe 58, and water is supplied to the water supply pipe 60. Thus, the reformed fuel, air and water are mixed in the ring member 54, whereby a raw fuel is obtained.

The raw fuel moves downwardly along the second channel 32 formed at a position surrounded by the inner cylindrical member 22, the outer cylindrical member 24, and the circular arc pipes 28a, 28b, whereupon heat exchange with the combustion gas flowing through the first channel 30 is performed. Thus, after the raw fuel is vaporized, the raw fuel flows from the raw fuel inlet 66, formed in a lower position of the outer cylinder 64 of the superheater 14, into the outer cylinder 64.

Thus, as shown in FIG. 2, the vaporized taw fuel flows upwardly through the superheating channel 82 formed between the cutouts 78 of the partition plates 74 and the pipes 72. The hot reformed gas (about 650° C.), after having been reformed as described, later moves downwardly along the channel 84 in the pipe 72. Thus, the temperature of the vaporized raw fuel moving through the superheating channel 82 is raised to a temperature of, e.g., around 550° C., and is supplied from the opening 92 of the distribution plate 86 into the reformer 16.

In the reformer 16, the vaporized and heated raw fuel flows through the raw fuel channel 100, and temporarily flows into the chamber 102. Thereafter, the raw fuel flows downwardly from the reforming fuel inlet 105. In the reformer 16, a plurality of rectifier plates 104 are provided in multiple stages. The raw fuel is rectified and reformed by the rectifier plates 104. Thus, a reformed gas is obtained.

Specifically, as a result of the methane in the reforming fuel, oxygen in the air, and water vapor, an oxidation reaction $CH_4 + 2O_2 \rightarrow CO_2 + 2H_2O$ (exothermic reaction) and a fuel reforming reaction $CH_4 + 2H_2O \rightarrow CO_2 + 4H_2$ (endothermic reaction) occur at the same time. Thus, a reformed gas, containing carbon dioxide and hydrogen, is produced. The reformed gas is supplied from the chamber 110 into the channels 84 of the pipes 72.

Then, the hot reformed gas (about 650° C.) supplied to the channels 84 moves downwardly, and heats the raw fuel moving along the superheating channel 82. Thereafter, the reformed gas is supplied to the channels 132 inside the pipes 126 of the preheater 18. The reformed gas moves downwardly through the channels 132 to preheat the heating fluid moving along the preheating channel 134, and then, the reformed gas is supplied to a fuel cell (not shown) or the like.

In the first embodiment, the evaporator 12 in which the raw fuel (reforming fuel) is evaporated, is provided along with the superheater 14 for raising the temperature of the evaporated raw fuel to a temperature required for the reforming reaction. The evaporator 12 is disposed concentrically around the superheater 14. Specifically, as shown in FIG. 2, the inner cylindrical member 22 of the evaporator 12 and the outer cylinder 64 of the superheater 14 are fixed together, wherein the raw fuel inlet 66, which connects the second channel 32 of the evaporator 12 and the superheating channel 82 of the superheater 14, is disposed at a lower end of the outer cylinder 64.

In this structure, the superheater 14 and the evaporator 12 needn't be connected by pipes, and therefore such pipes can be eliminated. Thus, heat radiation as a result of such pipes does not occur. An improvement in heat efficiency is achieved, while the fuel reforming apparatus 10 has a simple and compact structure.

Further, in the first embodiment, a heat suppression structure (fin member 142 or heat insulating space layer) is provided. Owing to this structure, heat transmission from the superheater 14 to the evaporator 12 is suppressed, and an improvement in heat exchange efficiency is easily achieved.

Further, the first and second channels 30, 32, which are formed in the evaporator 12, extend in the axial direction as indicated by the arrow A. The combustion gas and the raw fuel flow in the direction indicated by the arrow A, whereby heat exchange is performed between the combustion gas and the raw fuel. The outer region of the superheater 14 is surrounded by the first and second channels 30, 32. Accordingly, heat radiates from the outer region of the superheater 14, and an improvement in heat exchange efficiency can easily be achieved.

Further, according to the first embodiment, the superheater 14 for raising the temperature of the raw fuel (reforming fuel) that has been evaporated by the evaporator 12, and the reformer 16 for reforming the hot raw fuel, are disposed coaxially and connected in series with each other (see FIG. 2). Specifically, the distribution plate 86 of the superheater 14 has an opening 92 therein serving as an outlet for the reforming fuel gas, and through which the raw fuel is supplied as a hot reforming fuel to the reformer 16. The opening 92 is connected directly to the raw fuel channel 100.

Thus, the raw fuel from the superheater 14 is supplied directly from the opening 92 to the raw fuel channel 100. Thereafter, the raw fuel is supplied from the reforming fuel inlet 105 to the rectifier plate 104. Since the superheater 14 and the reformer 16 needn't be connected by pipes, such pipes can suitably be eliminated. Thus, heat radiation from the pipes does not occur. Accordingly, an improvement in heat efficiency is achieved, and the fuel reforming apparatus 10 has a simple and compact structure.

The chamber 110 is formed through the fourth separator 88, on the reformed gas outlet side of the reformer 16. The pipes 72 of the superheater 14 are fixed to the chamber 110. Therefore, the reformed gas, which is generated by the reformer 16, flows through the channels 84 into the pipes 72. Accordingly, heat exchange between the reformed gas and the raw fuel that flows through the superheating channel 82 occurs immediately. Thus, the hot reformed gas can be utilized as a superheating source for superheating the raw fuel, whereby an improvement in heat efficiency can easily be achieved.

Further, the cover member 111 is provided over the reformer 16 covering the outer cylinder 96, wherein a heat insulating layer (space) 111a is formed within the cover member 111. In this structure, the temperature of the raw fuel flowing through the raw fuel channel 100 is effectively prevented from being lowered, so that the reforming process can efficiently and reliably be performed.

In the first embodiment, the evaporator 12 includes circular arc pipes 28a, 28b, each having a circular arc shaped opening in cross section. The circular arc pipes 28a, 28b are arranged in two concentric rows. The catalyst outer cylinders 38a, 38b, each having a circular arc shaped opening in cross section, are disposed inside of the circular arc pipes 28a, 28b. The catalyst outer cylinders 38a, 38b contain metal honeycombs 40a, 40b therein. The first channel 30, which extends in the direction indicated by the arrow A, is provided inside of the circular arc pipes 28a, 28b, around the catalyst outer cylinders 38a, 38b. The second channel 32 extending in the direction indicated by the arrow A is formed at a position surrounded by the inner cylindrical member 22, the outer cylindrical member 24, and the circular arc pipes 28a, 28b.

In this structure, the combustion gas generated when the heating fluid passes through the metal honeycombs 40a, 40b flows downwardly along the first channel 30. The raw fuel mixed by the reforming fuel, air and water moves downwardly along the second channel 32, wherein heat exchange is performed between the combustion gas and the raw fuel.

As described above, the combustion gas, which serves as a heating fluid, moves in the same direction as the raw fuel, whereby efficient heat exchange is performed between the combustion gas and the raw fuel. Thus, it is possible to effectively reduce the dimension in the direction indicated by the arrow A. Heat exchange efficiency of the evaporator 12 can be improved, and advantageously, the evaporator 12 has a simple and compact structure.

Further, the circular arc pipes 28a and 28b are arranged in two concentric rows within the curved pipe member 20, and the catalyst outer cylinders 38a, 38b of the curved combustion catalyst 34 are provided for each of the circular arc pipes 28a, 28b. With this structure, a significant amount (i.e., length) of the first and second channels 30, 32 can be provided, whereby the heat exchange efficiency between the raw fuel and the combustion gas is improved advantageously.

The curved combustion catalyst 34 includes the flat metal honeycombs 40a, 40b. With this structure, it is possible to achieve a uniform temperature over the surfaces of the metal honeycombs 40a, 40b and maintain the performance of the catalyst. Further, temperature control of the catalyst can be implemented easily. Moreover, since the fin member 140, which facilitates heat transmission, is disposed between the circular arc pipes 28a, 28b, a further improvement in heat exchange between the raw fuel and the combustion gas is achieved.

Further, the ends of the circular arc pipes 28a, 28b on one side are fixed in the axial direction to the first separator 26, whereas the other ends of the circular arc pipes 28a, 28b are free ends. With this structure, expansion and contraction of the circular arc pipes 28a, 28b in the axial direction is not limited. Therefore, it is possible to prevent heat stress from being generated in the flow direction (axial direction) due to temperature differences. Accordingly, durability of the circular arc pipes 28a, 28b is improved, a reduction in height is easily achieved, and the overall weight and size of the evaporator 12 can be reduced advantageously.

Further, in the first embodiment, the superheater 14 and the reformer 16 are disposed coaxially and connected in series with each other. Further, the preheater 18 and the superheater 14 are disposed coaxially and connected in series on a side opposite to the reformer 16. With this structure, connection of the pipes to the reformer 16, the superheater 14, and the preheater 18 can be eliminated. Therefore, the overall size of the fuel reforming apparatus 10 can be reduced. Further, heat radiation from the pipes can be reduced, whereby an improvement in heat efficiency is achieved. Further, operation of the fuel reforming apparatus 10 can be started desirably with a small amount of energy, and hence, a reduction in energy consumption can reliably be achieved.

Figure 9:
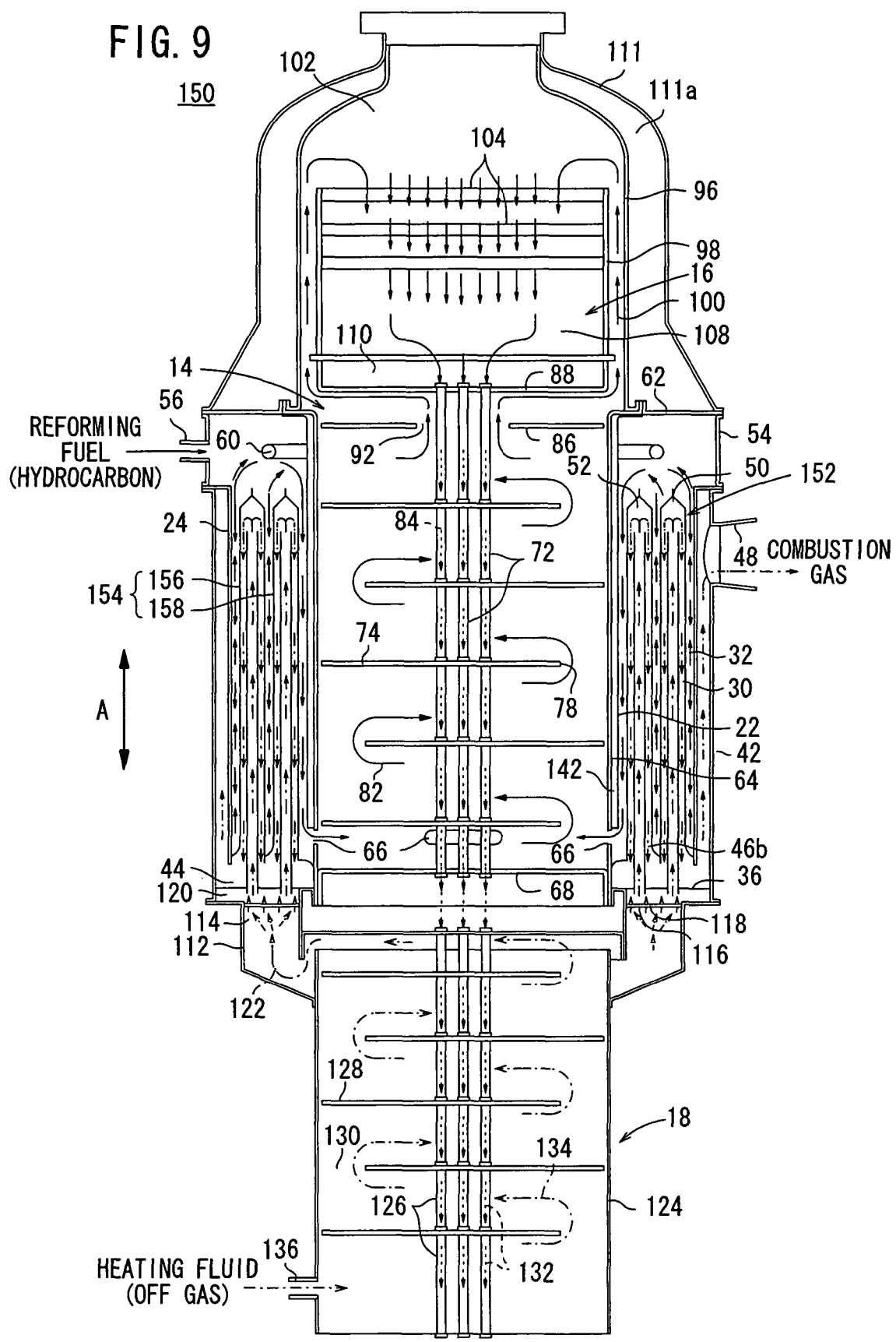
FIG. 9 is a cross sectional view showing gas flows within a fuel reforming apparatus according to a second embodiment of the present invention.

FIG. 9 is a cross sectional view showing gas flows inside a fuel reforming apparatus 150 according to a second embodiment of the present invention. Constituent elements that are identical to those of the fuel reforming apparatus 10 according to the first embodiment are labeled using the same reference numerals, and descriptions thereof shall be omitted. Also, in the third and fourth embodiments to be described later, constituent elements that are identical to those of the fuel reforming apparatus 10 according to the first embodiment are labeled using the same reference numerals, and descriptions thereof shall be omitted.

A cylindrical pipe member 154 of an evaporator 152 includes an outer cylindrical pipe 156 and an inner cylindrical pipe 158, which are arranged in two rows. Each of the outer cylindrical pipe 156 and the inner cylindrical pipe 158 has a ring shaped opening in cross section. The outer cylindrical pipe 156 is formed by fixing upper ends of two cylindrical plates 156a, 156b, whereas the inner cylindrical pipe 158 is formed by fixing upper ends of two cylindrical plates 158a, 158b.

Figure 10:
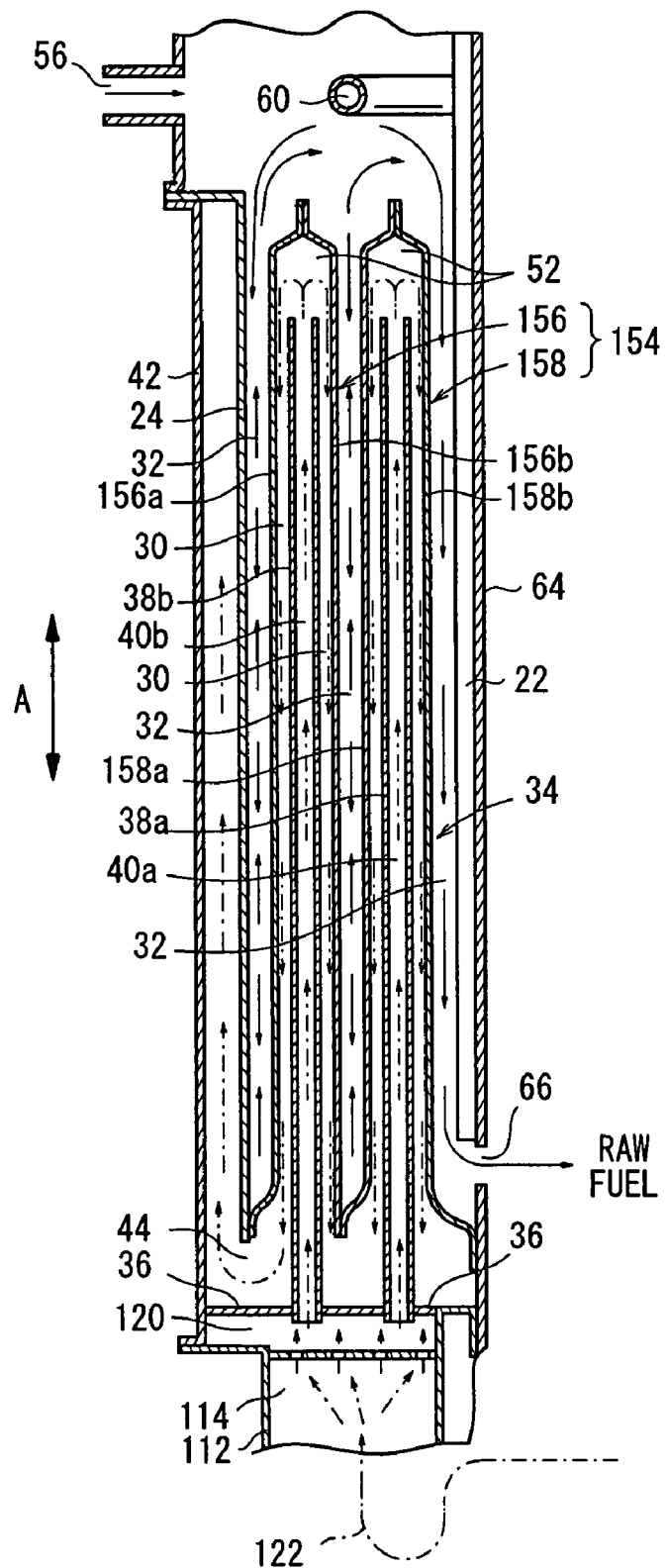
FIG. 10 is a partial cross sectional view showing an evaporator of the fuel reforming apparatus.

As shown in FIG. 10, chambers 52 are formed in upper positions of both the outer cylindrical pipe 156 and the inner cylindrical pipe 158. The lower end of the cylindrical plate 156a of the outer cylindrical pipe 156 is fixed to the outer cylindrical member 24. In addition, the lower end of the cylindrical plate 156b of the outer cylindrical pipe 156 and the lower end of the cylindrical plate 158a of the inner cylindrical pipe 158 are fixed together. The lower end of the cylindrical plate 158b of the inner cylindrical pipe 158 is fixed to the lower end of the outer cylinder 64 of the superheater 14, at a position below the raw fuel inlet 66.

Figure 11:
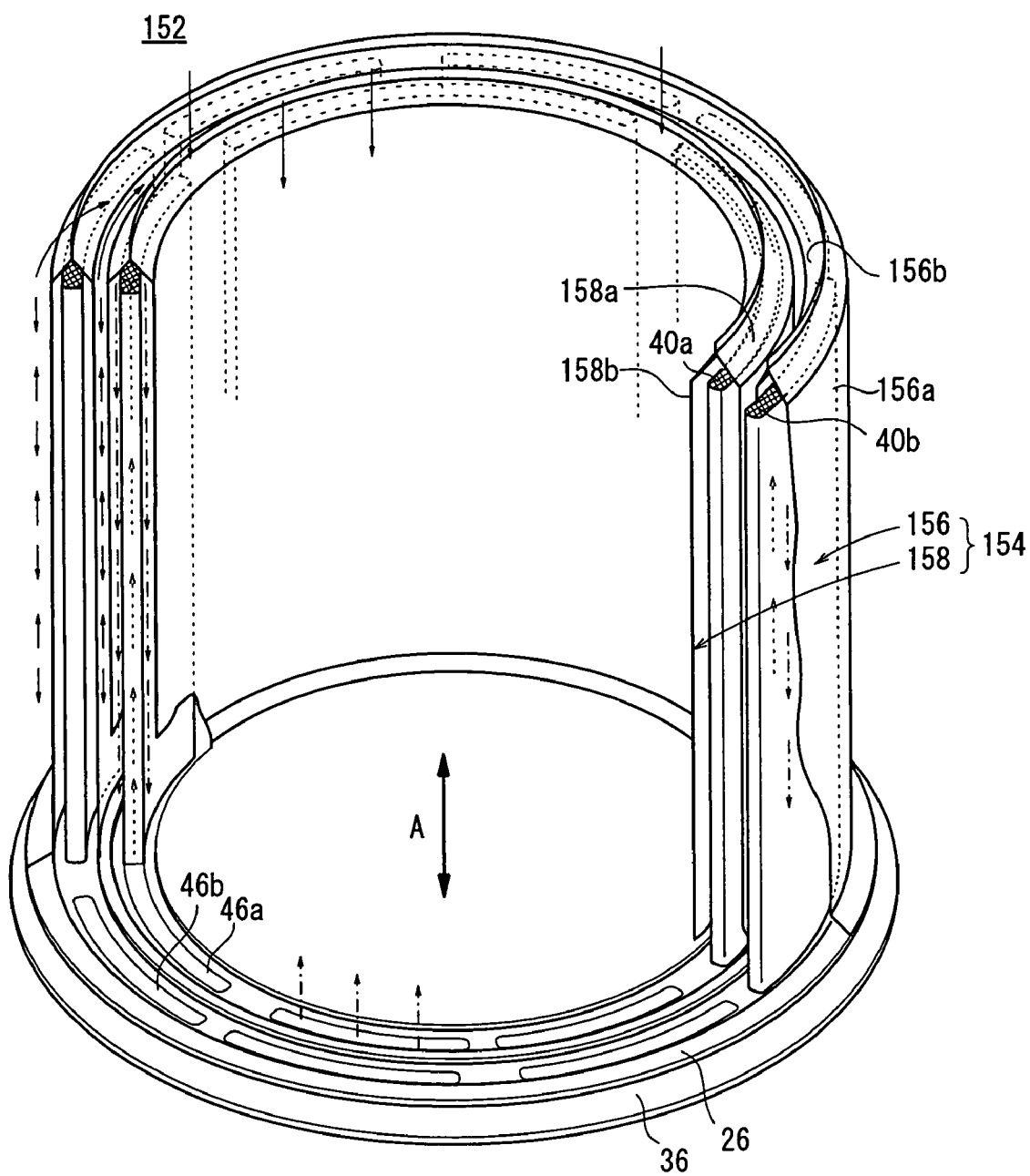
FIG. 11 is a perspective view, with partial omission, showing the evaporator.

In the second embodiment, having the structure as described above, when the raw fuel, including the reforming fuel, air, and water therein, is supplied to the evaporator 152, the water drops vertically primarily along the second channel 32, which is formed between the outer cylindrical pipe 156 and the inner cylindrical pipe 158, and the outer cylindrical member 24 (see FIGS. 10 and 11). At this time, as a result of combustion of the heating fluid in the curved combustion catalyst 34, a combustion gas is produced, whereupon the fuel gas flows downwardly along the first channel 30.

In this structure, water vapor is produced by heat exchange between the hot combustion gas and water, and the water vapor moves upwardly. When the reforming fuel and air are mixed together, a vaporized raw fuel can be obtained. The raw fuel flows from the raw fuel inlet 66 of the outer cylinder 64 of the superheater 14 into the outer cylinder 64.

Therefore, in the second embodiment, both the raw fuel and the combustion gas can flow along the axial direction of the cylindrical pipe member 154. Since the raw fuel flows back and forth within the channel 32, heat exchange is performed significantly and efficiently in comparison with the first embodiment. Further, the same advantages as those of the first embodiment can be obtained. For example, the fuel reforming apparatus has a simple and compact structure.

Figure 12:
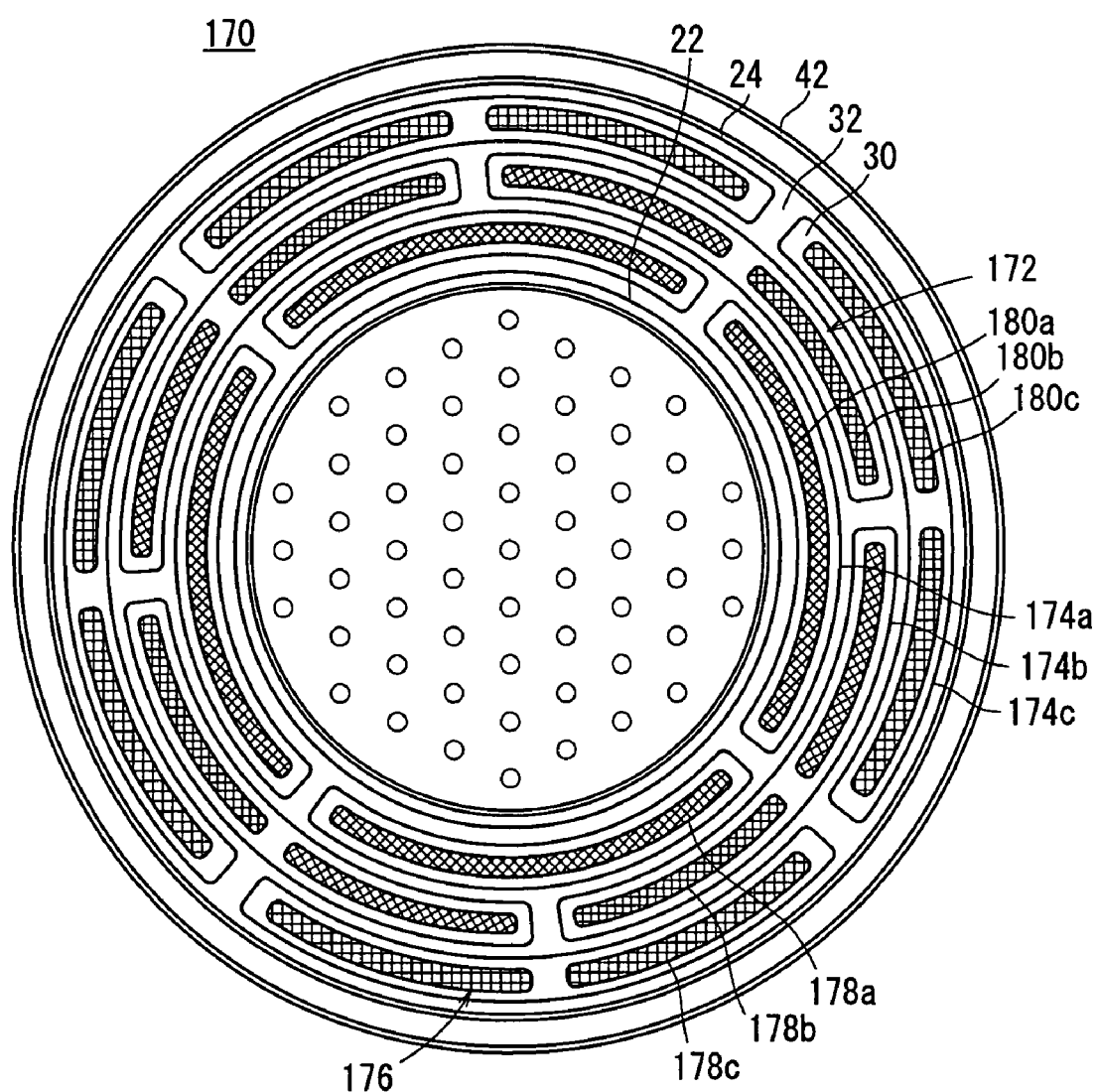
FIG. 12 is a cross sectional view showing an evaporator of a fuel reforming apparatus according to a third embodiment of the present invention.

FIG. 12 is a cross sectional view showing an evaporator 170 of a fuel reforming apparatus according to a third embodiment of the present invention.

The evaporator 170 has a curved pipe member 172, wherein the curved pipe member 172 includes a plurality of circular arc pipes 174a, 174b, and 174c, each having a circular arc shaped opening in cross section. The circular arc pipes 174a, 174b, and 174c are arranged concentrically and out of phase with each other. Thus, the second channel 32 is formed in a serpentine pattern between the circular arc pipes 174a to 174c. The catalyst outer cylinders 178a to 178c of the curved combustion catalyst 176 are formed inside of the circular arc pipes 174a to 174c. Metal honeycombs 180a to 180c are disposed inside the catalyst outer cylinders 178a to 178c.

In the third embodiment, having the structure as described above, the curved pipe members 172 and the curved combustion catalyst 176 are arranged concentrically in three rows. Accordingly, by providing a large number of first and second channels 30, 32, an increase in the output (increase in the processed raw material gas amount) can be handled easily, and heat exchange between the combustion gas and the raw fuel, in larger amounts, can be achieved.

Figure 13:
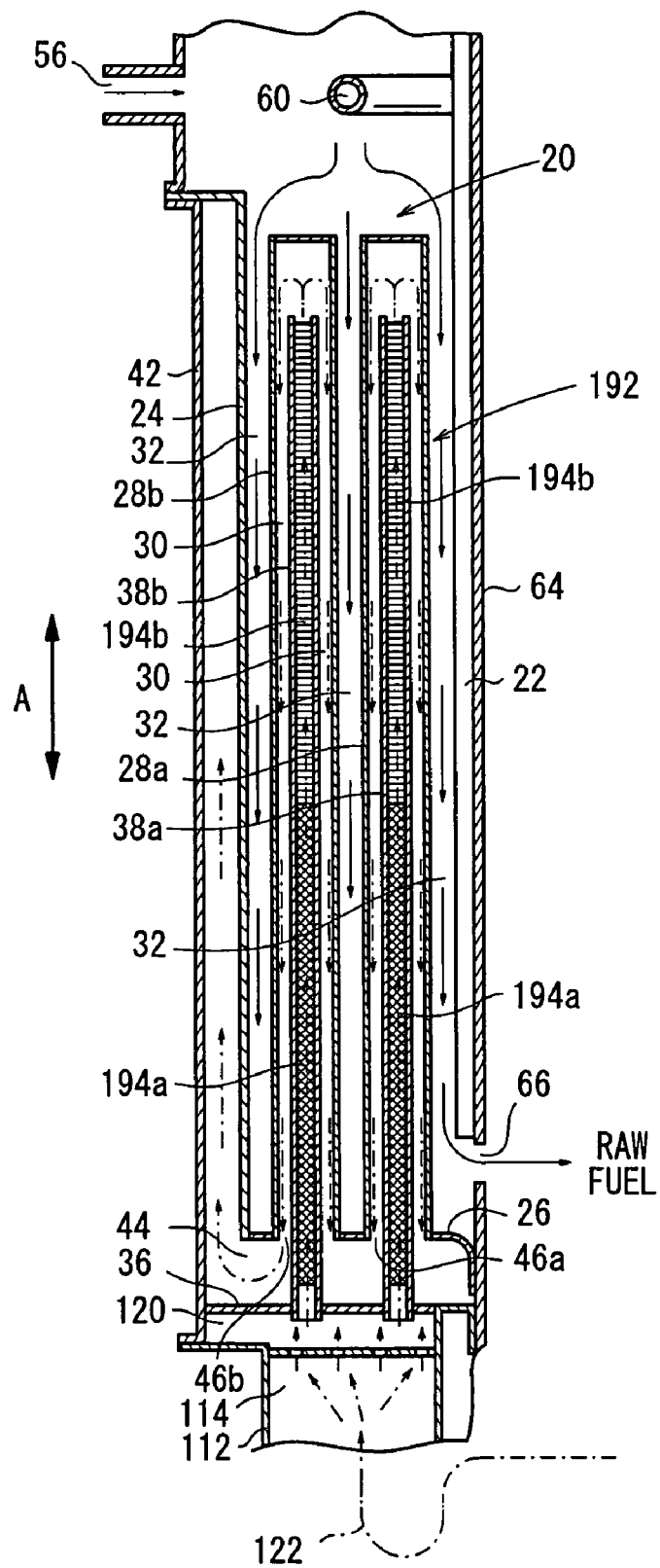
FIG. 13 is a cross sectional view showing an evaporator of a fuel reforming apparatus according to a fourth embodiment of the present invention.
Figure 14:
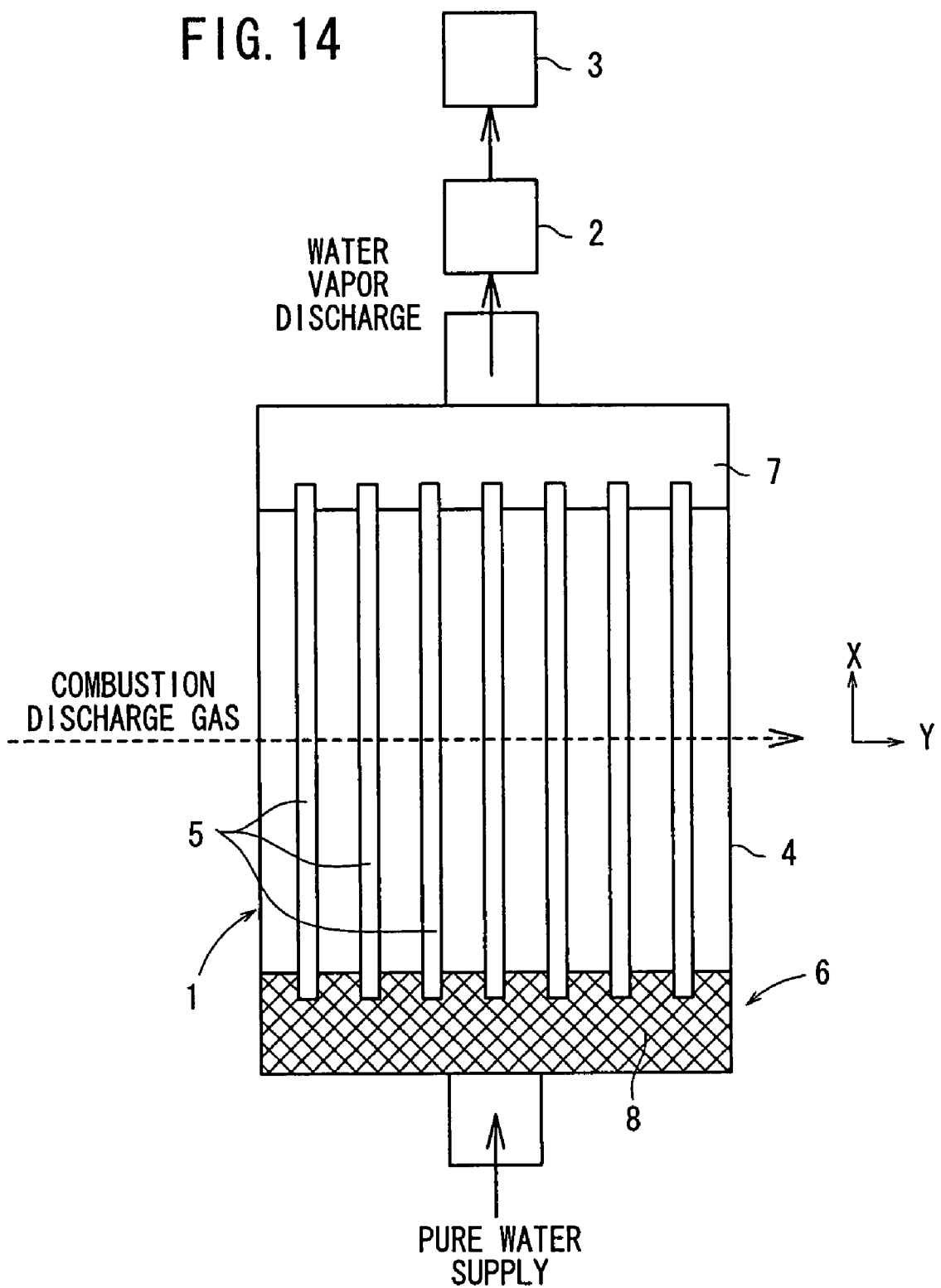
FIG. 14 is a schematic view showing a conventional reformer.

FIG. 13 is a view showing the structure of an evaporator 190 of a fuel reforming apparatus according to a fourth embodiment of the present invention.

A curved combustion catalyst 192, made up of an evaporator 190, includes a first combustion catalyst layer 194a and a second combustion catalyst layer 194b, provided within catalyst outer cylinders 38a, 38b and arranged along a flow direction of the heating fluid. Specifically, honeycombs supporting a Pt catalyst, exhibiting good performance during low temperature ignition, are provided at lower positions of the catalyst outer cylinders 38a, 38b. Further, honeycombs supporting a Pd/Pt alloy, exhibiting good purification performance especially with respect to methane, are provided at upper positions of the catalyst outer cylinders 38a, 38b.

In the fourth embodiment having the aforementioned structure, an improvement in low temperature ignition performance is achieved by the first combustion catalyst layer 194a, provided on an upstream side of the curved combustion catalyst 192. Further, even if $CH_4$ contained within the heating fluid flows without being combusted by the second combustion catalyst layer 194b provided on the downstream side, the $CH_4$ is purified inside the second combustion catalyst layer 194b. With this structure, $CH_4$ can reliably be prevented from becoming mixed in the combustion gas.

In the second to fourth embodiments, the evaporator 152, 170, 190 is disposed concentrically with and around the superheater 14. With this structure, the same advantages as the first embodiment can also be obtained. For example, pipes are suitably eliminated, and heat radiation from such pipes is prevented. An improvement in heat exchange efficiency is achieved, and moreover, the fuel reforming apparatus has a simple and compact structure.

The invention claimed is:

1. A fuel reforming apparatus for reforming a reforming fuel to produce a hydrogen rich fuel gas, said fuel reforming apparatus comprising:
    an evaporator for evaporating the reforming fuel by heat exchange with a heating fluid, the evaporator comprising:
        a plurality of reforming fuel channels extending in a longitudinal direction of the evaporator, and a plurality of heating channels for a heating fluid other than the reformed gas, the heating channels extending in the longitudinal direction of the evaporator, wherein each of the reforming fuel channels is disposed adjacent to one or more of the heating channels;

a superheater for raising the temperature of the evaporated reforming fuel to a temperature required for a reforming reaction, the superheater comprising a fuel inlet formed at a lower part of the superheater and a plurality of horizontal partition plates extending in the superheater so as to form a serpentine heating channel;

a reformer for reforming the reforming fuel, after the temperature of the reforming fuel has been raised, in order to produce a reformed gas;

a plurality of supply pipes for supplying a plurality of fluids to a ring member, the ring member attached to an outer casing disposed around the evaporator;

wherein the ring member, evaporator, and superheater are arranged to form a fluid flow path such that:
the plurality of fluids enter the ring member through the supply pipes before flowing to the evaporator,
the plurality of fluids are mixed in the evaporator to form the reforming fuel, and
the mixed reforming fuel flows from the evaporator to the superheater and through the serpentine heating channel to allow the mixed and evaporated reforming fuel to repeatedly move horizontally and upwardly, wherein said evaporator is disposed around said superheater and the evaporator and the superheater are concentrically disposed about an axis extending through the superheater, wherein said superheater and said reformer are coaxially connected together in series such that the reformer is arranged directly above said superheater, and the reformer is in an axially exterior location relative to the evaporator.

2. A fuel reforming apparatus according to claim 1, wherein an outer cylinder of said superheater has the fuel inlet for allowing the reforming fuel evaporated by said evaporator to flow into said superheater.

3. A fuel reforming apparatus according to claim 1, wherein a heat transmission suppressing structure is disposed between said outer cylinder of said superheater and an inner cylinder of said evaporator.

4. A fuel reforming apparatus according to claim 3, wherein said heat transmission suppressing structure includes a fin member.

5. A fuel reforming apparatus according to claim 1, wherein said reformer comprises an inner cylinder and an outer cylinder;
a reforming catalyst is filled inside of said inner cylinder; and
a channel forming a passage for said reforming fuel is formed between said inner cylinder and said outer cylinder.

6. A fuel reforming apparatus according to claim 5, wherein said superheater has an outlet for said reforming fuel, said outlet being connected to said channel at an end adjacent to said reformer; and
said reformer has a reforming fuel inlet connected to said channel, for supplying said reforming fuel to said inner cylinder, at another end opposite to said superheater.

7. A fuel reforming apparatus according to claim 6, wherein said reformer is connected to a pipe, said pipe being inserted from an end of said superheater into said superheater, for allowing a reformed gas that has passed through the reforming catalyst to flow for serving as a source for heating said reforming fuel.

8. A fuel reforming apparatus according to claim 1, wherein a heat insulating cover member is disposed around said reformer.

9. A fuel reforming apparatus according to claim 1, wherein said evaporator further comprises:
a curved pipe member;
an inner cylindrical member and an outer cylindrical member disposed concentrically with said curved pipe member on both sides of said curved pipe member;
a first channel serving as a passage for one of said heating fluid or said reforming fuel within said curved pipe member; and
a second channel serving as a passage for the other of said heating fluid or said reforming fuel, said second channel being formed at a position surrounded by said inner cylindrical member, said outer cylindrical member, and said curved pipe member.

10. A fuel reforming apparatus according to claim 9, wherein a plurality of said curved pipe members are arranged in a plurality of rows along a plurality of concentric circles.

11. A fuel reforming apparatus according to claim 9, wherein a curved combustion catalyst is provided within said curved pipe member;
said first channel comprises a heating fluid channel for said heating fluid after combustion by said curved combustion catalyst; and
said second channel comprises a reforming fuel channel, allowing said reforming fuel to flow within said second channel and undergo heat exchange with said heating fluid.

12. A fuel reforming apparatus according to claim 11, wherein said curved combustion catalyst comprises a flat metal honeycomb.

13. A fuel reforming apparatus according to claim 11, wherein a fin member for facilitating heat transmission is disposed in said reforming fuel channel.

14. A fuel reforming apparatus according to claim 9, wherein one end of said curved pipe member in an axial direction comprises a fixed end, and another end of said curved pipe member in the axial direction comprises a free end.

15. A fuel reforming apparatus according to claim 9, wherein said curved pipe member comprises at least two circular arc pipes, each having a circular arc shaped opening in cross section disposed on the same circle; and
at least one curved combustion catalyst, which is circularly arc shaped in cross section, is disposed inside each of said circular arc pipes.

16. A fuel reforming apparatus according to claim 9, wherein said curved pipe member comprises a cylindrical pipe having a ring shaped opening in cross section; and
a curved combustion catalyst, which is circularly arc shaped in cross section, is disposed inside said cylindrical pipe.

17. A fuel reforming apparatus according to claim 1, further comprising a preheater for preheating said heating fluid in order to evaporate said reforming fuel in said evaporator; and
said preheater is disposed coaxially and connected in series with said superheater, on a side opposite to said reformer.

* * * * *